(12) United States Patent
Yasui et al.

(10) Patent No.: US 9,546,704 B2
(45) Date of Patent: Jan. 17, 2017

(54) ATTACHMENT STRUCTURE FOR URGING MEMBER

(71) Applicant: TOYOTA JIDOSHA KABUSHIKI KAISHA, Toyota-shi, Aichi-ken (JP)

(72) Inventors: Yohsuke Yasui, Okazaki (JP); Hideki Tokimatsu, Izumi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 39 days.

(21) Appl. No.: 14/664,240

(22) Filed: Mar. 20, 2015

(65) Prior Publication Data

US 2015/0330472 A1   Nov. 19, 2015

(30) Foreign Application Priority Data

May 16, 2014   (JP) .................................. 2014-102326

(51) Int. Cl.
*F16L 5/00* (2006.01)
*F16F 1/12* (2006.01)
*B60N 2/72* (2006.01)

(52) U.S. Cl.
CPC . *F16F 1/12* (2013.01); *B60N 2/72* (2013.01); *F16F 2230/0005* (2013.01); *Y10T 403/459* (2015.01)

(58) Field of Classification Search
CPC ....... F16F 1/12; F16F 2230/0005; B60N 2/72; F16L 5/00; H02G 3/22
USPC ........................................................... 16/2.1
See application file for complete search history.

(56) References Cited

U.S. PATENT DOCUMENTS

| 1,527,023 | A | * | 2/1925 | Bowden | G10K 1/08 16/2.1 |
|---|---|---|---|---|---|
| 3,016,562 | A | * | 1/1962 | Reid | F16L 5/00 16/2.1 |
| 3,091,795 | A | * | 6/1963 | Budwig | F16L 5/027 16/2.1 |
| 4,033,535 | A | * | 7/1977 | Moran | H02G 3/0658 174/153 G |
| 5,069,586 | A | * | 12/1991 | Casey | A44B 13/007 16/2.1 |
| 5,093,957 | A | * | 3/1992 | Do | E04C 2/365 16/2.1 |

(Continued)

FOREIGN PATENT DOCUMENTS

| DE | 201 13 595 U1 | 3/2002 |
|---|---|---|
| JP | S58-1836 U | 1/1983 |

(Continued)

OTHER PUBLICATIONS

Partial Translation of Feb. 2, 2016 Office Action issued in Japanese Patent Application 2014-102326.

*Primary Examiner* — Roberta Delisle
(74) *Attorney, Agent, or Firm* — Oliff PLC (57) ABSTRACT

An attachment structure for an urging member includes an attachment member and a ring-like bushing. The attachment member has an insertion hole. The bushing is press-fitted in the insertion hole. The urging member includes an attached portion inserted in an inner side of the bushing. The bushing has a first portion arranged in the insertion hole and a second portion located outside the insertion hole. An inner diameter of the first portion is smaller than an inner diameter of the second portion.

3 Claims, 10 Drawing Sheets

(56) References Cited

U.S. PATENT DOCUMENTS

| | | | | |
|---|---|---|---|---|
| 5,687,453 | A | * | 11/1997 | Megregian .......... E05D 11/0081 16/221 |
| 6,061,870 | A | * | 5/2000 | Dodge ................... A63C 10/04 16/2.1 |
| 6,485,241 | B1 | * | 11/2002 | Oxford ............... B60R 11/0217 16/2.1 |
| 7,730,584 | B2 | * | 6/2010 | Duffy ....................... E05D 5/062 16/295 |
| 8,096,017 | B2 | * | 1/2012 | Van Walraven .......... F16L 5/00 16/2.1 |
| 2008/0163453 | A1 | * | 7/2008 | Joseph ................... F16F 1/373 16/2.1 |
| 2011/0162165 | A1 | * | 7/2011 | Schumacher, Jr. ....... B64C 1/14 16/2.1 |

FOREIGN PATENT DOCUMENTS

| | | |
|---|---|---|
| JP | 2006-292032 A | 10/2006 |
| JP | 2009142484 A | 7/2009 |
| WO | 89/09900 A1 | 10/1989 |

\* cited by examiner

ATTACHMENT STRUCTURE FOR URGING MEMBER

BACKGROUND OF THE INVENTION

The present invention relates to a structure for attaching an urging member, such as a coil spring, to an attachment member via a bushing.

Japanese Laid-Open Patent Publication No. 2009-142484 discloses a structure for attaching a metal back spring to a metal frame embedded in the seat back of a vehicle seat. The attachment structure includes a plastic bushing, which is arranged in the frame having an insertion hole. The back spring is attached to the frame via the bushing.

Figure 20:
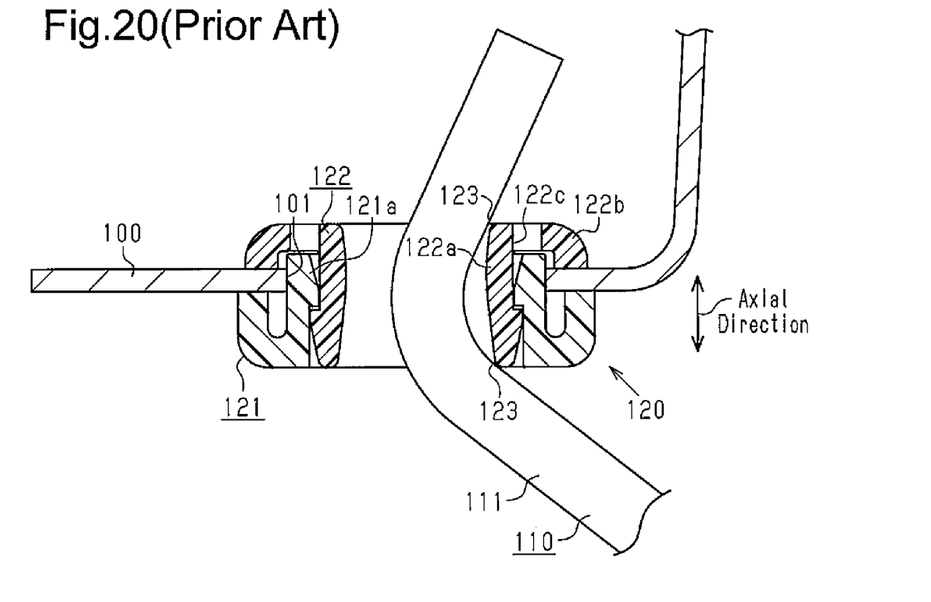
FIG. 20 is a cross-sectional view showing a part of an attachment member, a part of a coil spring, and a bushing of a conventional attachment structure for an urging member.
Figure 21:
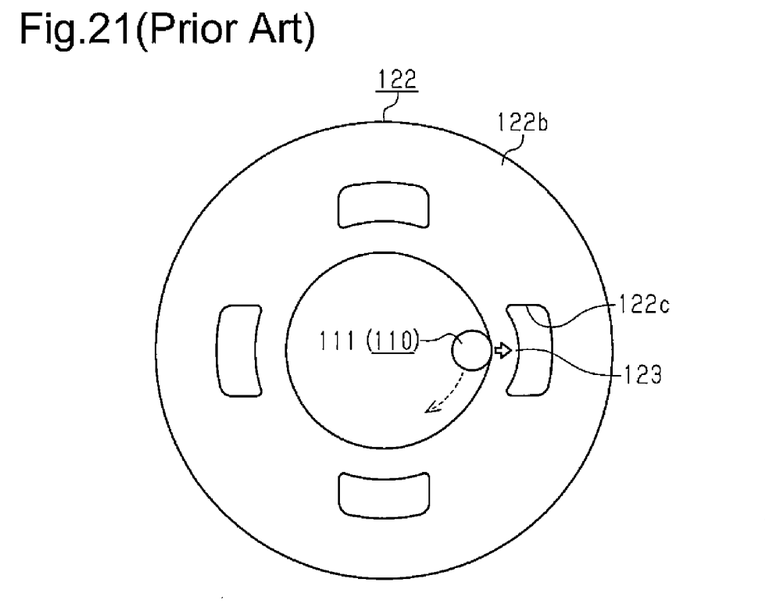
FIG. 21 is a diagram schematically showing an attached portion of the coil spring illustrated in FIG. 20 in a state biting into the bushing.

Other conventional attachment structures for urging members include, for example, the structure illustrated in FIGS. 20 and 21. In this attachment structure, as illustrated in FIG. 20, an attached portion 111 of an urging member 110 is inserted in an insertion hole 101 formed in a plate-like attachment member 100. The urging member 110 is thus attached to the attachment member 100. A bushing 120 is attached to the insertion hole 101. The bushing 120 includes a first bushing forming member 121 and a second bushing forming member 122.

With reference to FIG. 20, the first bushing forming member 121 includes a first cylindrical portion 121a and a flange portion. The first cylindrical portion 121a is press-fitted into the insertion hole 101 of the attachment member 100 from below as viewed in FIG. 20. The flange portion extends from the basal end (the lower end portion as viewed in the drawing) of the first cylindrical portion 121a. The second bushing forming member 122 has a second cylindrical portion 122a and a flange portion 122b. The second cylindrical portion 122a is fitted into the inner space of the first cylindrical portion 121a from above the attachment member 100 (from above as viewed in FIG. 20). The flange portion 122b extends from the basal end (the upper end portion as viewed in the drawing) of the second cylindrical portion 122a. As illustrated in FIG. 21, a plurality of through holes 122c are formed and arranged circumferentially at the radially inner side of the flange portion 122b, which is connected to the second cylindrical portion 122a.

Referring to FIG. 20, the attached portion 111 of the urging member 110 is inserted into the inner side of the second cylindrical portion 122a. Since the attached portion 111 is bent, the attached portion 111 contacts inner side surfaces of opposite axial ends of the second cylindrical portion 122a.

In the attachment structure illustrated in FIGS. 20 and 21, an excessive load applied to the bushing 120 by the urging member 110 may deform contact sections 123, each of which is a section of the second bushing forming member 122 that contacts the attached portion 111 of the urging member 110. For example, as illustrated in FIG. 21, the attached portion 111 may contact the inner circumferential surface of the basal end of the second cylindrical portion 122a and one of the insertion holes 122c may be located radially outward of the contact sections 123. In this case, if an excessive load is applied to one of the contact sections 123 by the attached portion 111, the load of the attached portion 111 deforms the contact section 123 radially outward, thus causing the attached portion 111 to bite into the second bushing forming member 122. In this state, when the attached portion 111 moves in the direction represented by the arrow of a broken line in FIG. 21, the force produced by such movement of the attached portion 111 may act on the second bushing forming member 122, thus causing the bushing 120 to co-rotate with the attached portion 111. This may cause the bushing 120 to slide on the attachment member 100, thus generating noise from such sliding.

SUMMARY OF THE INVENTION

Accordingly, it is an objective of the present invention to provide an attachment structure for an urging member capable of restraining noise generation between a bushing and an attachment member by restraining an attached portion of an urging member from co-rotating with a bushing.

To achieve the foregoing objective and in accordance with one aspect of the present invention, an attachment structure for an urging member is provided that includes an attachment member and a ring-like bushing. The attachment member has an insertion hole. The bushing is press-fitted in the insertion hole. The urging member includes an attached portion inserted in an inner side of the bushing. The bushing has a first portion arranged in the insertion hole and a second portion located outside the insertion hole. An inner diameter of the first portion is smaller than an inner diameter of the second portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 5 is a perspective view showing the first bushing forming member as viewed from another angle than the angle from which FIG. 4 is viewed;

FIG. 10 is a perspective view showing the second bushing forming member as viewed from another angle than the angle from which FIG. 9 is viewed;

DETAILED DESCRIPTION OF THE PREFERRED EMBODIMENTS

An attachment structure for an urging member according to a first embodiment will now be described with reference to FIGS. 1 to 16.

Figure 1:
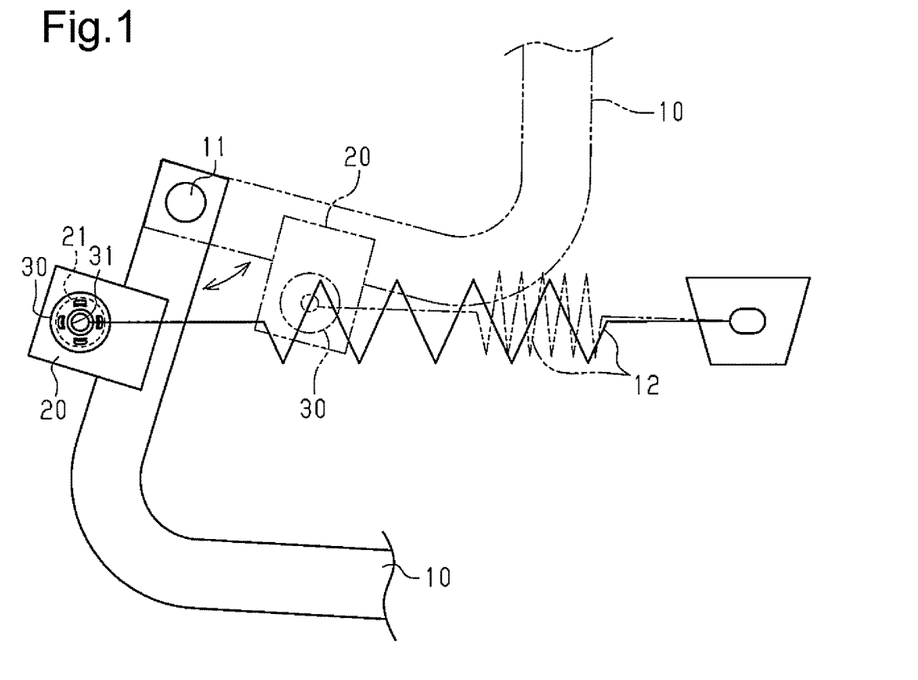
FIG. 1 is a diagram schematically showing the configurations of an attachment structure for an urging member according to a first embodiment and a part of a trunk hinge to which an attachment member of the attachment structure is fixed.

As illustrated in FIG. 1, in the first embodiment, a coil spring 12, which is an example of an "urging member", is attached to a substantially L-shaped trunk hinge 10 for a vehicle via the attachment structure. The trunk hinge 10 is supported pivotally by a shaft 11, which is supported by a non-illustrated vehicle body. An attachment member 20, which is configured by a metal plate, is fixed to the trunk hinge 10. The coil spring 12 has an end supported by the vehicle body and an opposite end having an attached portion 12a, which is attached to the attachment member 20. The direction of the thickness of the attachment member 20 substantially coincides with the direction in which the shaft 11 extends.

Figure 2:
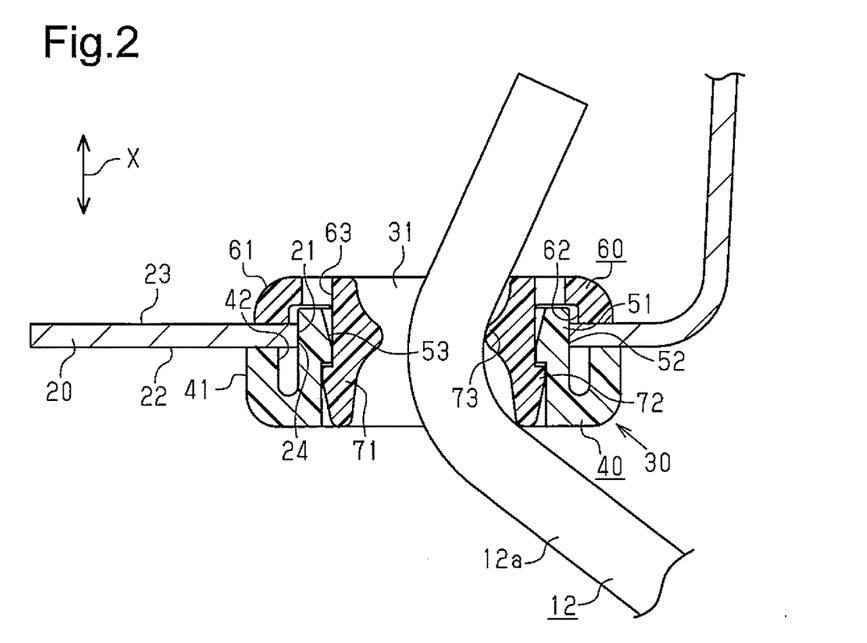
FIG. 2 is a cross-sectional view showing a part of the attachment member, a part of the coil spring, and the bushing, which are illustrated in FIG. 1.

As illustrated in FIGS. 1 and 2, the attachment member 20 includes a first surface 22 (the lower surface as viewed in FIG. 2) and a second surface 23 (the upper surface as viewed in the drawing), which are on the opposite sides in the thickness direction of the attachment member 20. The attachment member 20 also has an insertion hole 21, which extends through the attachment member 20. The insertion hole 21 has openings in both the first surface 22 and the second surface 23.

A ring-like bushing 30 is press-fitted in the insertion hole 21 of the attachment member 20. The bushing 30 is formed of plastic. The attached portion 12a of the coil spring 12 is inserted into the inner side of the bushing 30 to attach the coil spring 12 to the attachment member 20. Referring to FIG. 1, as the trunk hinge 10 pivots about the shaft 11, the coil spring 12 is extended or contracted and the attached portion 12a of the coil spring 12 moves on an inner circumferential surface of the bushing 30 in a circumferential direction of the bushing 30. As the coil spring 12 is further extended, the load applied to the bushing 30 by the coil spring 12 increases. The axial direction of the bushing 30 coincides with the thickness direction of the attachment member 20. Hereinafter, the axial direction of the bushing 30 will be referred to as "the axial direction X". The bushing 30 includes a receiving hole 31, which receives the attached portion 12a of the coil spring 12.

The bushing 30 will now be described with reference to FIGS. 2 to 15.

Figure 3:
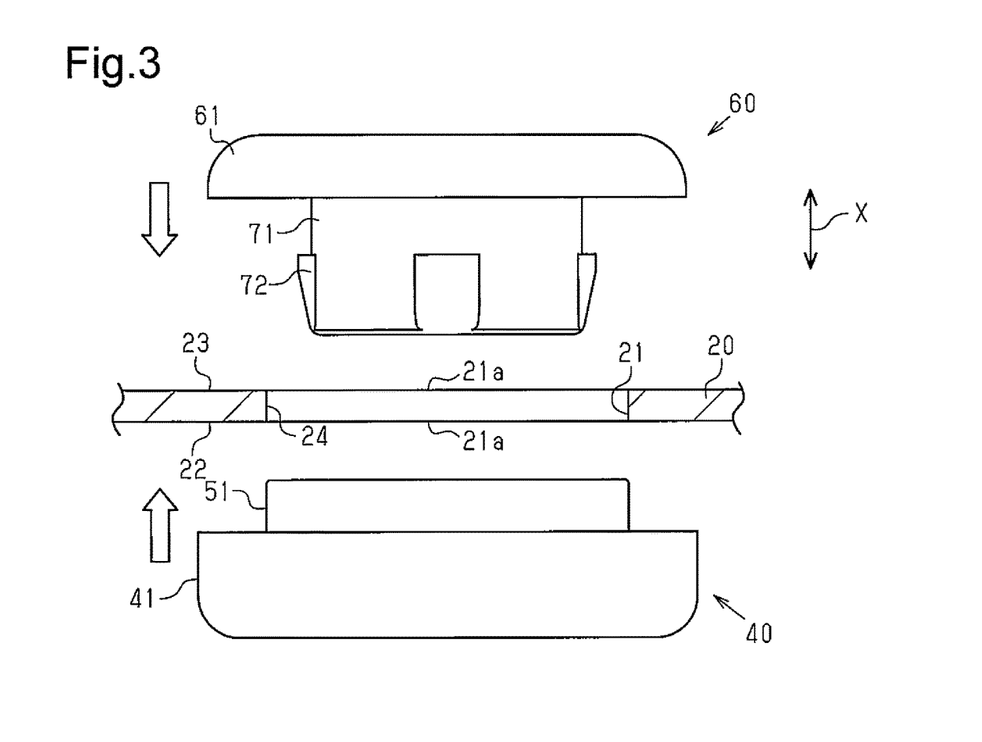
FIG. 3 is a side view showing a first bushing forming member and a second bushing forming member in a state being joined to the attachment member.

As illustrated in FIGS. 2 and 3, the bushing 30 includes a first bushing forming member 40 and a second bushing forming member 60. With reference to FIG. 3, the first bushing forming member 40 is attached to the attachment member 20 from below, and the second bushing forming member 60 is attached to the attachment member 20 from above.

Referring to FIGS. 2 to 8, the first bushing forming member 40 will hereafter be described. As illustrated in FIGS. 2 to 5, the first bushing forming member 40 has a first cylindrical portion 51 and an annular first rim portion 41. The first rim portion 41 extends from the basal end (the lower end portion as viewed in FIG. 3) of the first cylindrical portion 51 and is arranged radially outward of the first cylindrical portion 51. With reference to FIG. 2, the first cylindrical portion 51 is press-fitted in the insertion hole 21 of the attachment member 20. An outer circumferential surface 52 of the first cylindrical portion 51, which is arranged in the insertion hole 21, is held in tight contact with an inner circumferential surface 24, which forms the insertion hole 21 in the attachment member 20.

Figure 4:
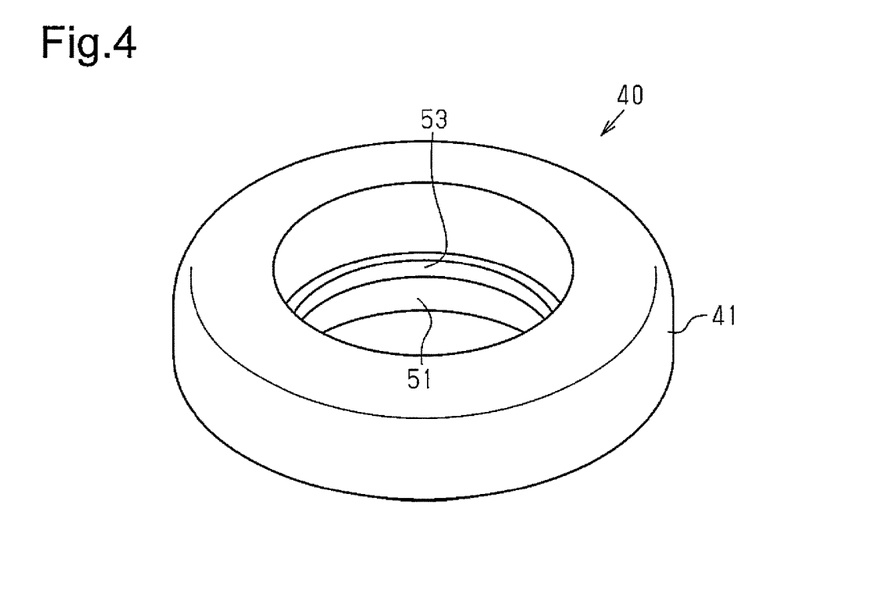
FIG. 4 is a perspective view showing the first bushing forming member of FIG. 3.
Figure 5:
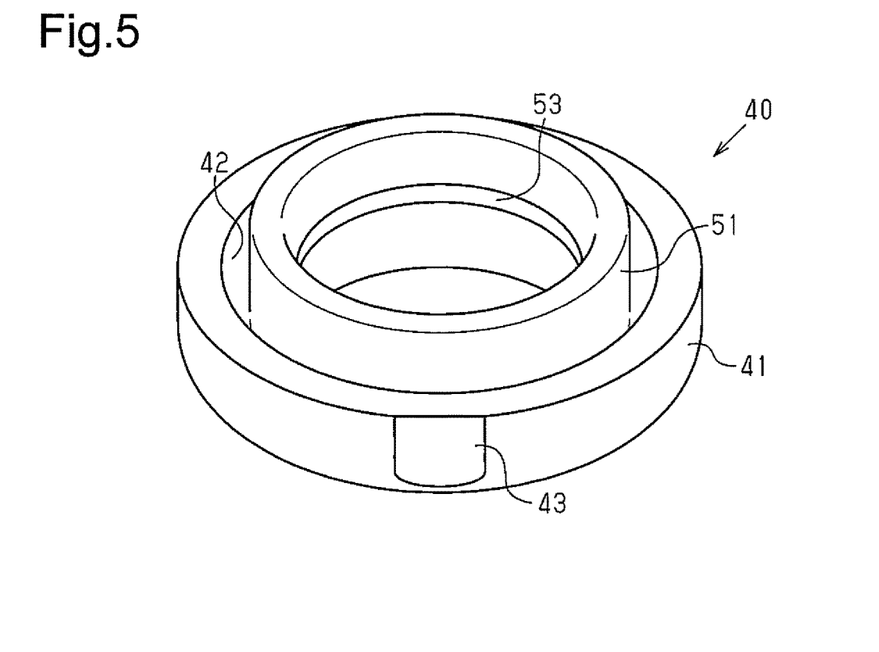
Figure 8:
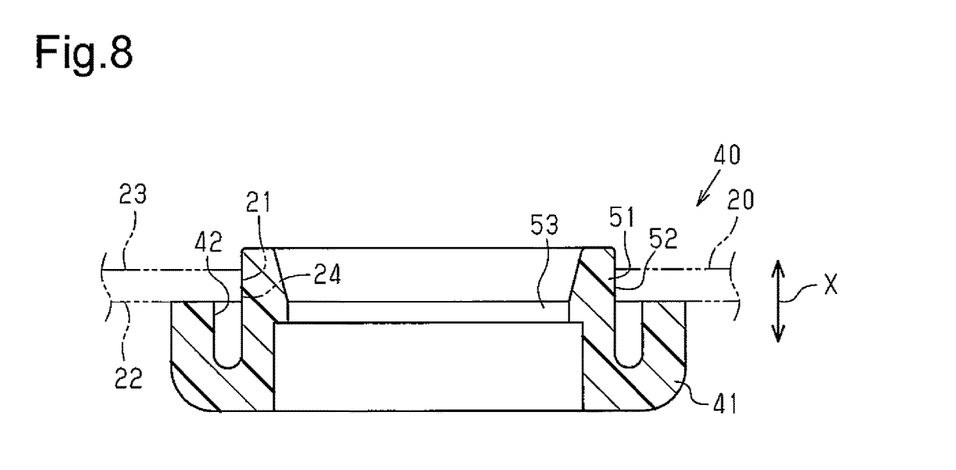
FIG. 8 is a cross-sectional view taken along line 8-8 of FIG. 6.
Figure 9:
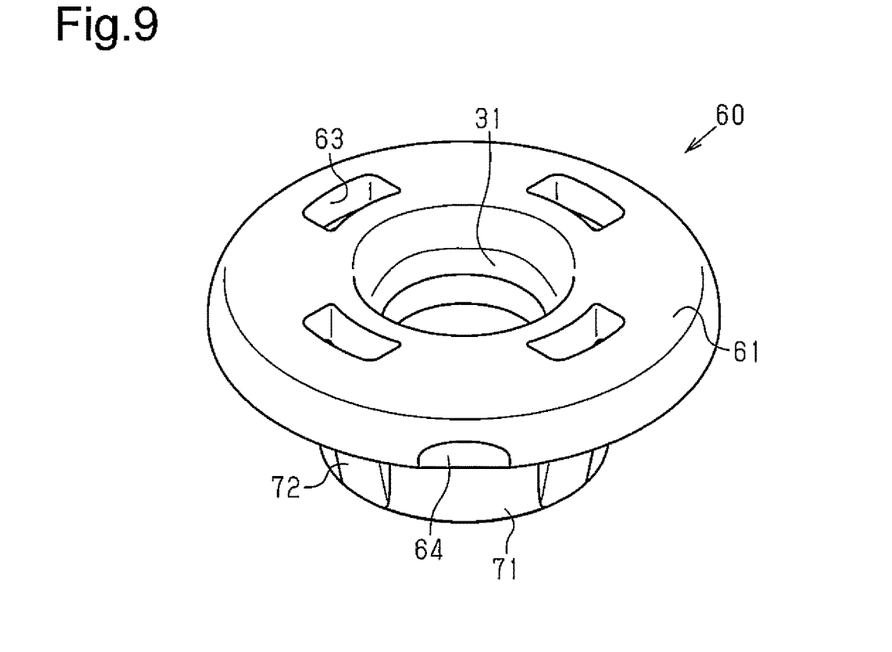
FIG. 9 is a perspective view showing the second bushing forming member illustrated in FIG. 3.

As illustrated in FIGS. 4, 5, and 8, an annular stopper portion 53 is formed in the inner circumferential surface of a distal portion (the upper end portion as viewed in FIG. 8) of the first cylindrical portion 51 and extends over the entire circumference of the inner circumferential surface. The radial length of the stopper portion 53, which is the thickness of the stopper portion 53, increases from the distal end toward the basal end of the first cylindrical portion 51.

Figure 6:
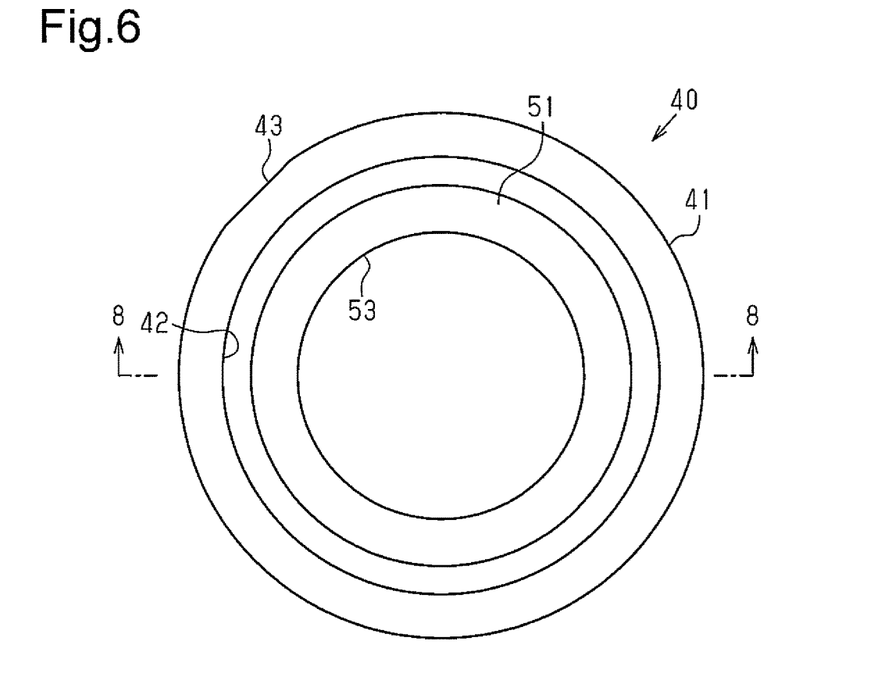
FIG. 6 is a plan view showing the first bushing forming member of FIG. 3.
Figure 7:
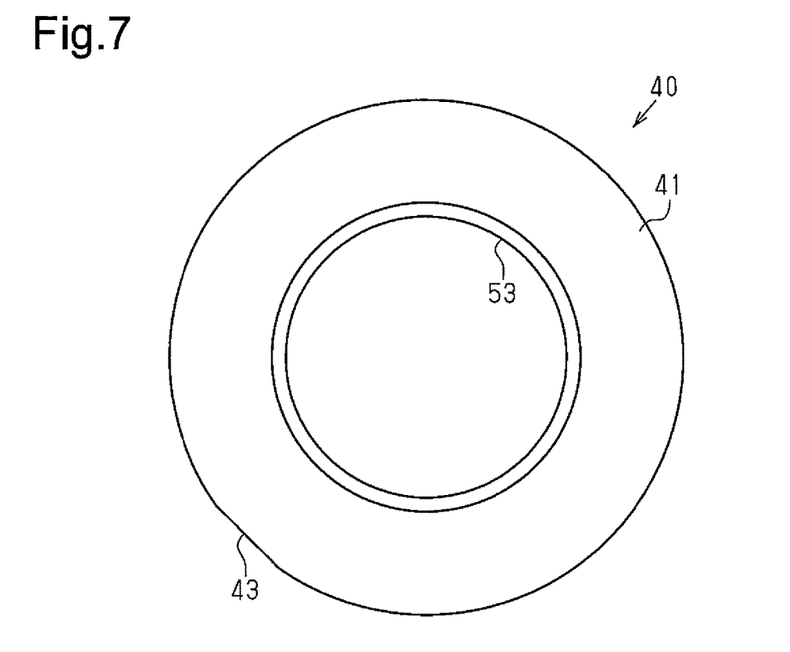
FIG. 7 is a plan view showing the first bushing forming member as viewed from the opposite side from FIG. 6.

With reference to FIGS. 2, 3, and 8, the first rim portion 41 contacts the first surface 22 of the attachment member 20. Referring to FIGS. 5, 6, and 8, the outer circumferential surface of the first cylindrical portion 51 and the surface of the first rim portion 41 facing the outer circumferential surface form an annular groove portion 42. The outer diameter of the first cylindrical portion 51 is equal to the diameter of the insertion hole 21. The upper opening of the groove portion 42 is thus blocked by the attachment member 20 when the first bushing forming member 40 is attached to the attachment member 20. As illustrated in FIGS. 6 and 7, a positioning cutout portion 43 is formed in an outer circumferential portion of the first rim portion 41. The cutout portion 43 has a shape formed by removing a part of the surface of the first rim portion 41.

The second bushing forming member 60 will now be described with reference to FIGS. 2, 3, and 9 to 13. As illustrated in FIGS. 2 and 3, the second bushing forming member 60 includes a second cylindrical portion 71 and an annular second rim portion 61. The second rim portion 61 extends radially outward from the basal end (the upper end portion as viewed in FIG. 3) of the second cylindrical portion 71. The second rim portion 61 contacts the second surface 23 of the attachment member 20 when the second bushing forming member 60 is attached to the attachment member 20. Referring to FIGS. 2, 12, and 13, an annular accommodation groove 62 is formed in the surface of the second rim portion 61 facing the attachment member 20. As illustrated in FIG. 2, the distal end of the first cylindrical portion 51 of the first bushing forming member 40 is inserted into the accommodation groove 62.

With reference to FIGS. 9 to 12, a plurality of (four) through holes 63 are formed in a radially inner section of the second rim portion 61 and spaced apart circumferentially at equal intervals. Each of the through holes 63 has an opening in the bottom surface of the accommodation groove 62. The number of the through holes 63 may be any suitable number other than four (for example, three or five).

Figure 11:
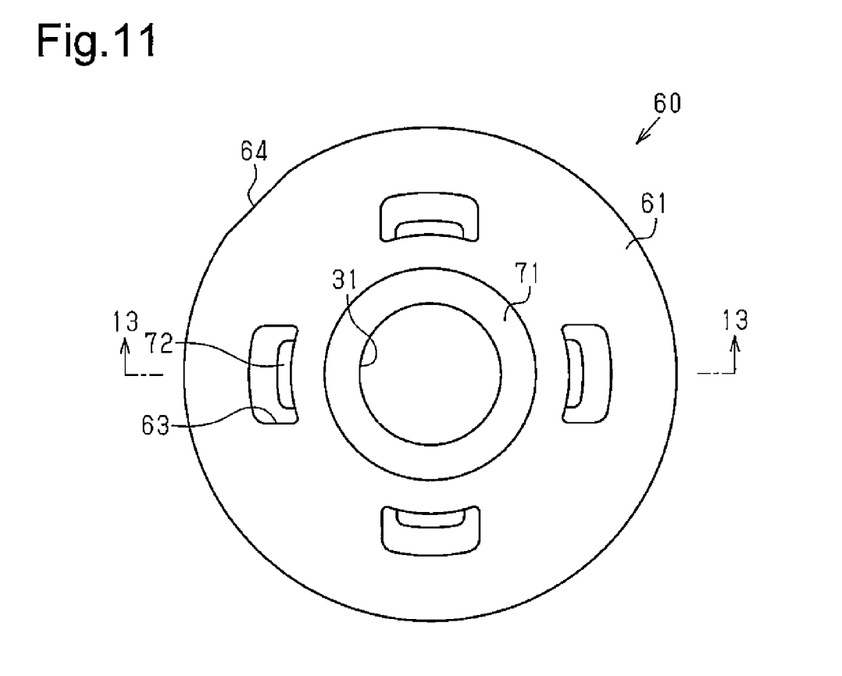
FIG. 11 is a plan view showing the second bushing forming member illustrated in FIG. 2.
Figure 12:
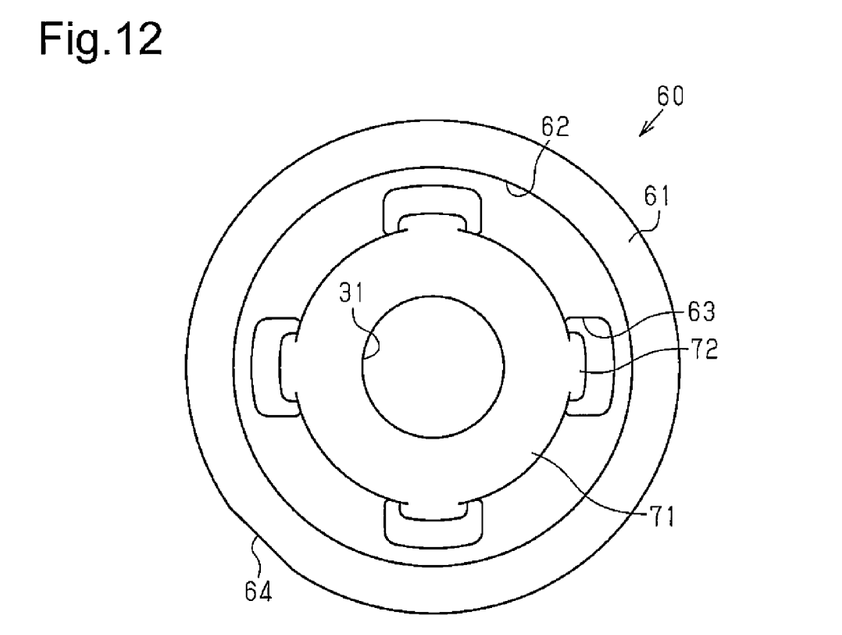
FIG. 12 is a plan view showing the second bushing forming member as viewed from the opposite side from FIG. 11.
Figure 13:
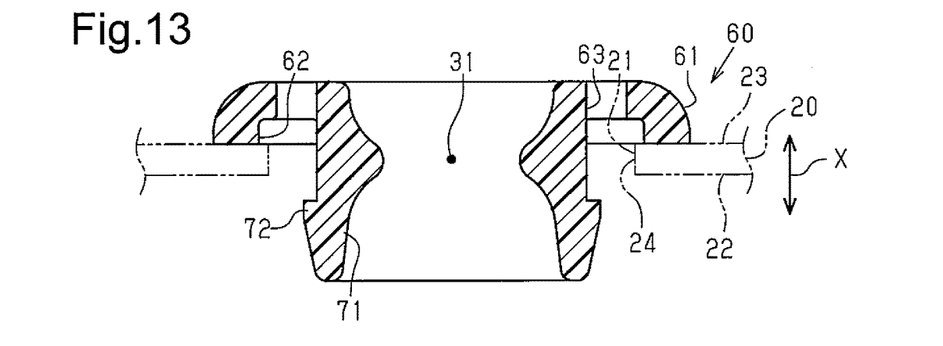
FIG. 13 is a cross-sectional view taken along line 13-13 of FIG. 11.

As illustrated in FIGS. 11 and 12, a positioning cutout portion 64 is formed in an outer circumferential portion of the second rim portion 61. Like the cutout portion 43 of the first rim portion 41, the cutout portion 64 of the second rim portion 61 has a shape formed by removing a part of the surface of the second rim portion 61. The cutout portion 64, which is formed in the second rim portion 61, enables joint of the second bushing forming member 60 to the first bushing forming member 40 such that, for example, the cutout portion 64 is arranged at a circumferential position coinciding with the position of the cutout portion 43 of the first bushing forming member 40.

Referring to FIG. 2, the second cylindrical portion 71 is fitted in the inner side of the first cylindrical portion 51 of the first bushing forming member 40. In this state, the outer circumferential surface of the second cylindrical portion 71 contacts the portion of the stopper portion 53 of the first bushing forming member 40 having the minimum inner diameter.

Figure 10:
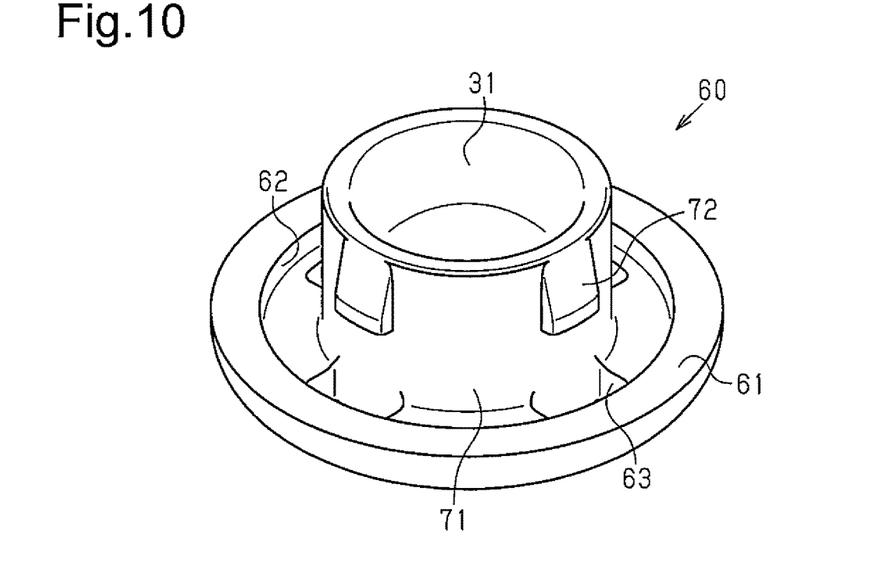

As illustrated in FIGS. 10 to 12, a plurality of (four) projecting portions 72 are projected from the outer circumferential surface of the distal end (the upper end portion as viewed in FIG. 10) of the second cylindrical portion 71 and spaced apart circumferentially at equal intervals. The radial length of each of the projecting portions 72, which is the thickness of the projecting portion 72, increases from the distal end toward the basal end of the second cylindrical portion 71. With reference to FIG. 11, the circumferential position of each projecting portion 72 coincides with the circumferential position of the corresponding through hole 63, which is formed in the second rim portion 61.

As illustrated in FIG. 2, when the second bushing forming member 60 is joined to the first bushing forming member 40, the second cylindrical portion 71 of the second bushing forming member 60 is inserted from the distal opening (the upper opening as viewed in FIG. 2) of the first cylindrical portion 51 of the first bushing forming member 40. Then, after the projecting portions 72 of the second cylindrical portion 71 pass the stopper portion 53 of the first cylindrical portion 51, the projecting portions 72 are located below the stopper portion 53 and thus stopped by the stopper portion 53. This restricts displacement of the second bushing forming member 60 with respect to the first bushing forming member 40 in the axial direction X.

As illustrated in FIGS. 2 and 13, the second cylindrical portion 71 includes a first portion arranged in the insertion hole 21 of the attachment member 20 and second portions located outside the insertion hole 21. The first portion "arranged in the insertion hole 21" refers to the portion of the second cylindrical portion 71 corresponding to the insertion hole 21, or, more specifically, the portion of the second cylindrical portion 71 that is located at the position that coincides with the position of the insertion hole 21 in the axial direction X. The second portions may be referred to also as the portions other than the first portion. The inner diameter of the first portion is smaller than the inner diameter of each of the second portions. When the radial length of the second cylindrical portion 71 is defined as "the thickness of the second cylindrical portion 71", the thickness of the second cylindrical portion 71 corresponding to the first portion is greater than the thickness of the second cylindrical portion 71 corresponding to the second portion.

Specifically, when the middle position between the first surface 22 and the second surface 23 in the axial direction X is defined as "the middle position of the attachment member 20", the inner diameter of the second cylindrical portion 71 is minimized at the middle position of the attachment member 20. Also, the inner diameter of the second cylindrical portion 71 increases as the distance from the middle position of the attachment member 20 increases in the axial direction X. That is, the inner diameter of the second cylindrical portion 71 corresponding to each second portion increases as the distance from a corresponding opening 21a (see FIG. 3) of the insertion hole 21 increases in the axial direction X. Further, in each second portion, the rate of change of the inner diameter of the second cylindrical portion 71 with respect to change of position in the axial direction X, which is the rate of change of the inner diameter of the second cylindrical portion 71 in the axial direction X, decreases as the distance from the corresponding opening 21a of the insertion hole 21 increases in the axial direction X.

With reference to FIG. 2, the attached portion 12a of the coil spring 12 is inserted in the inner side of the second bushing forming member 60. That is, the inner side of the second cylindrical portion 71 functions as the receiving hole 31 of the bushing 30. In this case, the inner diameter of the second cylindrical portion 71 is minimized in the portion corresponding to the position between the first rim portion 41 and the second rim portion 61 in the axial direction X. The second cylindrical portion 71 supports the attached portion 12a by means of the portion of the second cylindrical portion 71 having the minimum inner diameter. That is, the portion of the second cylindrical portion 71 having the minimum inner diameter, which is, in other words, the first portion, functions as a support section 73 for supporting the attached portion 12a.

Figure 14:
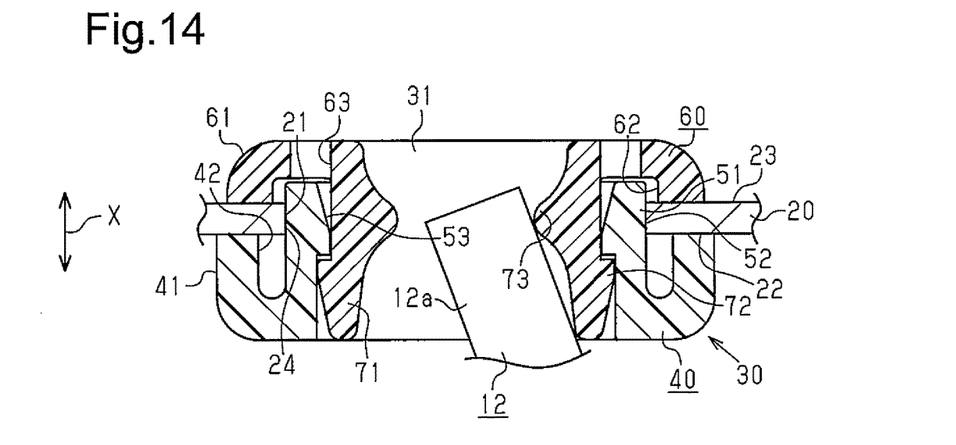
FIG. 14 is a cross-sectional view showing an attached portion of a coil spring in a state being attached to a bushing.
Figure 15:
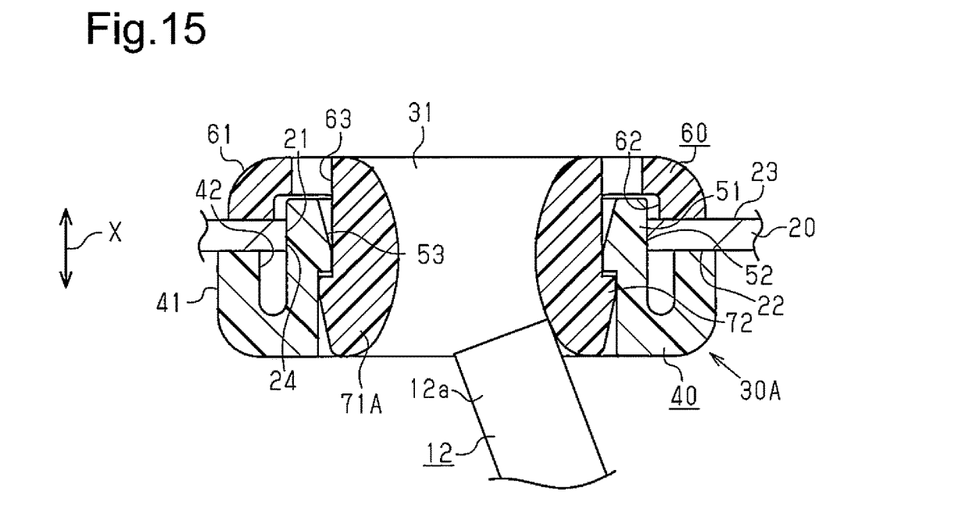
FIG. 15 is a cross-sectional view showing an attached portion of a coil spring in a state being attached to a bushing in a comparative example.

A mode of attachment of the attached portion 12a to the bushing 30 will hereafter be described with reference to FIGS. 14 and 15. FIG. 14 illustrates the attached portion 12a in a state being attached to the bushing 30 of the first embodiment. FIG. 15 illustrates the attached portion 12a in a state being attached to a bushing 30A of a comparative example.

As illustrated in FIG. 15, in the bushing 30A of the comparative example, the rate of change of the inner diameter of a second cylindrical portion 71A in the axial direction X is great in the vicinities of the opening ends of the second cylindrical portion 71A. The inner circumferential edge of the bushing 30A near the opposite opening ends is thus moderately curved. This makes it difficult for the operator to locate the openings of the bushing 30A when the operator gropes for the openings. As a result, the operator cannot easily insert the distal end of the attached portion 12a into the receiving hole 31 of the bushing 30A.

In contrast, as illustrated in FIG. 14, in the bushing 30 of the first embodiment, the rate of change of the inner diameter of the second cylindrical portion 71 in the axial direction X decreases toward the opening ends of the second cylindrical portion 71, unlike the bushing 30A of the comparative example illustrated in FIG. 15. The inner circumferential edge of the bushing 30 near the opposite opening ends is thus comparatively angulated. As a result, even if the bushing 30 is arranged at such a position that the bushing 30 cannot be easily located visually, the operator is allowed to locate the openings of the bushing 30 easily when the operator gropes for the openings. The operator is thus allowed to insert the distal end of the attached portion 12a easily into the receiving hole 31 of the bushing 30.

Figure 16:
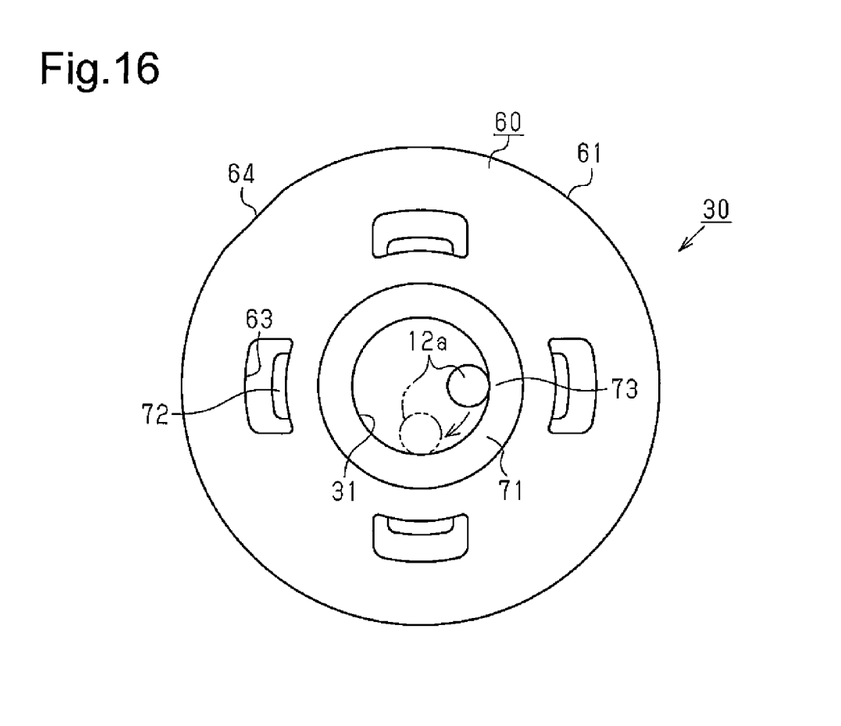
FIG. 16 is a plan view showing the attached portion of the coil spring in a state moving circumferentially on an inner circumferential surface of the bushing as a trunk hinge pivots.

Operation of the attachment structure for pivoting the trunk hinge 10 will hereafter be described with reference to FIG. 16.

The support section 73 of the second bushing forming member 60 supports the attached portion 12a of the coil spring 12. Load is thus applied to the support section 73 by the coil spring 12. The support section 73 is supported by the first cylindrical portion 51 in the insertion hole 21 from the radially outer side. The outer circumferential surface 52 of the first cylindrical portion 51 in the insertion hole 21 is held in tight contact with the inner circumferential surface 24 of the attachment member 20 (see FIG. 2). That is, radially outward deformation of the support section 73 is restricted by the first cylindrical portion 51 and the attachment member 20. As a result, the attached portion 12a of the coil spring 12 scarcely bites into the support section 73, which supports the attached portion 12a.

As a result, when the trunk hinge 10 is pivoted and the attached portion 12a of the coil spring 12 moves on the inner circumferential surface of the bushing 30 in the circumferential direction of the bushing 30, the force produced by such movement of the attached portion 12a is scarcely transmitted to the second cylindrical portion 71. The attached portion 12a is thus caused to slide on the inner circumferential surface of the second cylindrical portion 71, as illustrated in FIG. 16. This restrains the bushing 30 from co-rotating with the attached portion 12a. The bushing 30 thus does not rotate relative to the attachment member 20.

The above configuration achieves the following advantages.

(1) The inner diameter of the second cylindrical portion 71 corresponding to the first portion arranged in the insertion hole 21 is smaller than the inner diameter of the second cylindrical portion 71 corresponding to each second portion located outside the insertion hole 21. The second cylindrical portion 71 thus supports the attached portion 12a of the coil spring 12 by means of the section of the second cylindrical portion 71 having the minimum inner diameter or in the vicinity of this section. This restrains support of the attached portion 12a in the vicinity of the corresponding one of the opening ends of the second cylindrical portion 71 having a comparatively great inner diameter. Also, the first cylindrical portion 51, which is arranged radially outward of the second cylindrical portion 71, is press-fitted in the insertion hole 21. Therefore, when the second cylindrical portion 71 receives load from the coil spring 12, radially outward displacement of the support section 73 of the second cylindrical portion 71 is restricted by the first cylindrical portion 51 and the attachment member 20. The attached portion 12a scarcely bites into the second cylindrical portion 71. As a result, when the attached portion 12a moves on the inner circumferential surface of the bushing 30 in the circumferential direction of the bushing 30, the force produced by such movement of the attached portion 12a is not readily transmitted to the second cylindrical portion 71, or, in other words, the bushing 30. This restrains the bushing 30 from co-rotating with the attached portion 12a, thus restraining slide of the bushing 30 with respect to the attachment member 20. Therefore, by restraining the bushing 30 from co-rotating with the attached portion 12a, noise generation between the bushing 30 and the attachment member 20 is restrained.

(2) In the first embodiment, the inner diameter of the second cylindrical portion 71 increases as the distance from the openings 21a of the insertion hole 21 increases in the axial direction X. In other words, the inner diameter of the second cylindrical portion 71 decreases as the distance from the opening ends of the second cylindrical portion 71 increases in the axial direction X. Therefore, when the attached portion 12a of the coil spring 12 is received in the receiving hole 31 of the bushing 30, the distal end of the attached portion 12a is moved on the inner circumferential surface of the bushing 30, or, in other words, the inner circumferential surface of the second cylindrical portion 71, and guided toward the axis of the bushing 30 by the inner circumferential surface of the second cylindrical portion 71. As a result, the attached portion 12a is attached smoothly to the attachment member 20.

(3) In each of the second portions, the rate of change of the inner diameter of the second cylindrical portion 71 in the axial direction X decreases as the distance from the corresponding opening 21a of the insertion hole 21 increases. Therefore, compared to a case in which, in the second portion, the rate of change of the inner diameter of the second cylindrical portion 71 in the axial direction X is constant or increases as the distance from the corresponding opening 21a of the insertion hole 21 increases, the inner circumferential edges of the opposite opening ends of the ring-like bushing 30 are angulated. As a result, when the attached portion 12a of the coil spring 12 is attached to the attachment member 20, the operator can easily locate the openings of the bushing 30, which is attached to the attachment member 20, by groping. This allows the operator to easily insert the attached portion 12a into the receiving hole 31 of the bushing 30.

The above embodiment may be modified as follows.

Figure 17:
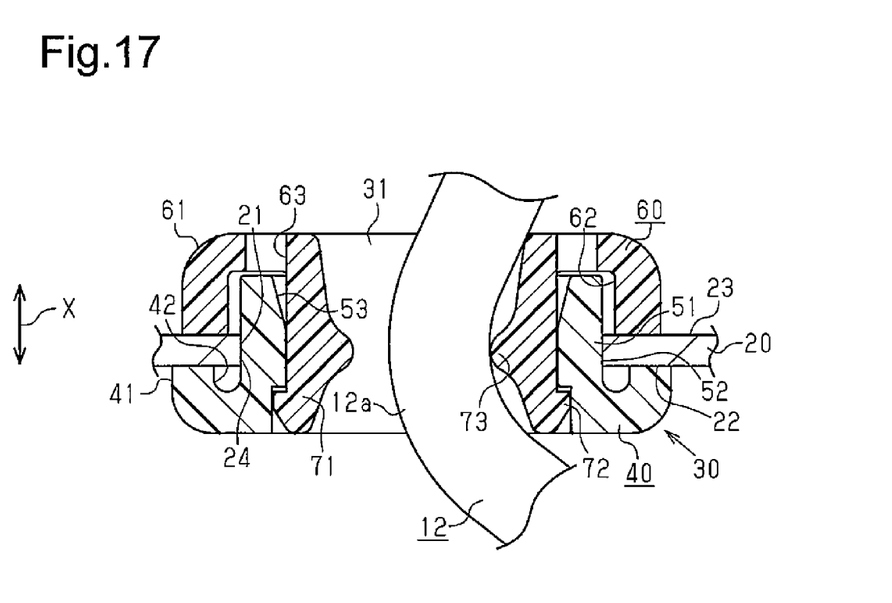
FIG. 17 is a cross-sectional view showing a part of an attachment member, a part of a coil spring, and a bushing according to a second embodiment.

It is preferable to modify the section of the second cylindrical portion 71 (the bushing 30) having the minimum inner diameter as needed in correspondence with the mode of attachment of the bushing 30 to the attachment member 20. In the first embodiment, as illustrated in FIG. 2, the attachment member 20 is located slightly above the middle position of the bushing 30 in the axial direction X. The section of the bushing 30 having the minimum inner diameter is thus arranged slightly above the middle of the second cylindrical portion 71 in the axial direction X. However, as in a second embodiment shown in FIG. 17, if the attachment member 20 is located below the middle of the bushing in the axial direction X, the section of the bushing 30 having the minimum inner diameter may be arranged below the middle of the bushing 30 in the axial direction X. Even in this configuration, an advantage equivalent to the advantage (1) is obtained by forming the second cylindrical portion 71 such that the inner diameter of the second cylindrical portion 71 corresponding to the first portion is smaller than the inner diameter of the second cylindrical portion 71 corresponding to each second portion.

Figure 18:
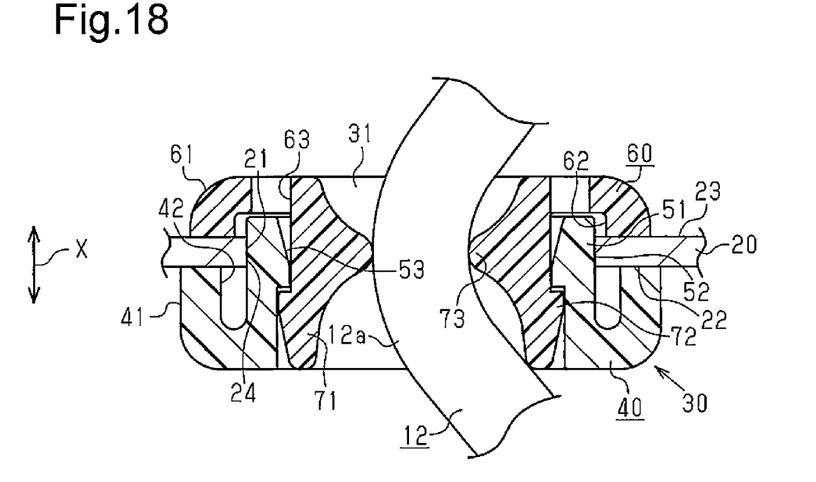
FIG. 18 is a cross-sectional view showing a part of an attachment member, a part of a coil spring, and a bushing according to a third embodiment.

The inner diameter of the second cylindrical portion 71 corresponding to the first portion may be modified as needed as long as the attached portion 12a of the coil spring 12 can be inserted into the inner side of the second cylindrical portion 71. For example, as in a third embodiment illustrated in FIG. 18, the minimum inner diameter of the second cylindrical portion 71 may be substantially equal to the diameter of the attached portion 12a. An advantage equivalent to the advantage (1) is obtained also by this configuration.

The inner diameter of the second cylindrical portion 71 corresponding to the first portion may be constant regardless of positions in the axial direction X. Even in this case, an advantage equivalent to the advantage (1) is obtained by forming the second cylindrical portion 71 such that the inner diameter of the second cylindrical portion 71 corresponding to the first portion is smaller than the inner diameter of the second cylindrical portion 71 corresponding to each second portion.

Figure 19:
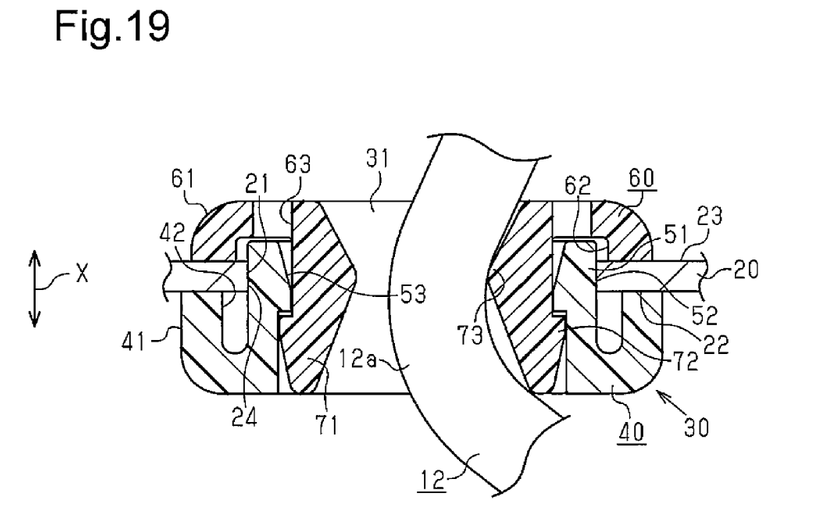
FIG. 19 is a cross-sectional view showing a part of an attachment member, a part of a coil spring, and a bushing according to a fourth embodiment.

In the first embodiment, in each second portion, the rate of change of the inner diameter of the second cylindrical portion 71 in the axial direction X decreases as the distance from the corresponding opening 21a of the insertion hole 21 increases. However, as long as the second cylindrical portion 71 is formed such that the inner diameter of the second cylindrical portion 71 corresponding to each second portion is greater than the inner diameter of the second cylindrical portion 71 corresponding to the first portion, the rate of change of the inner diameter of the second cylindrical portion 71 in the axial direction X may be constant in each second portion regardless of positions in the direction X, as in a fourth embodiment illustrated in FIG. 19, for example. Also, the rate of change of the inner diameter of the second cylindrical portion 71 corresponding to each second portion in the axial direction X may increase as the distance from the corresponding opening 21a of the insertion hole 21 increases, as in a comparative example illustrated in FIG. 15. Even in these configurations, an advantage equivalent to the advantage (1) is obtained by forming the second cylindrical portion 71 such that the inner diameter of the second cylindrical portion 71 corresponding to the first portion is smaller than the inner diameter of the second cylindrical portion 71 corresponding to each second portion.

An annular rib may be formed on the inner circumferential surface of the second cylindrical portion 71 and extended over the entire inner circumferential surface such that the rib is arranged in the first portion of the second cylindrical portion 71. In this case, the attached portion 12a of the coil spring 12 is supported by the rib and the rib receives load from the attached portion 12a. Radially outward displacement of the rib is restricted by the first cylindrical portion 51 and the attachment member 20. As a result, an advantage equivalent to the advantage (1) is obtained.

As long as the bushing press-fitted in the insertion hole 21 is not displaced in the axial direction X, both the rim portion 41 and the rim portion 61 may be omitted in the corresponding one of the first bushing forming member 40 and the second bushing forming member 60.

The bushing may be configured by a single forming member. Even in this case, an advantage equivalent to the advantage (1) is obtained by forming the bushing such that the inner diameter of the bushing corresponding to the portion of the bushing arranged in the insertion hole 21 is smaller than the inner diameter of the bushing corresponding to the portions of the bushing located outside the insertion hole 21.

The through hole 63 does not necessarily have to be formed in the second rim portion 61 of the second bushing forming member 60.

The attachment member 20 may be attached to any other suitable member than the trunk hinge 10 as long as the other member pivots about a shaft.

Therefore, the present examples and embodiments are to be considered as illustrative and not restrictive and the invention is not to be limited to the details given herein, but may be modified within the scope and equivalence of the appended claims.

The invention claimed is:

1. An attachment structure for an urging member comprising:
    an attachment member having an insertion hole; and
    a ring-shaped bushing press-fitted in the insertion hole, wherein:
    the urging member includes an attached portion inserted in an inner side of the bushing,
    the bushing has a first portion arranged in the insertion hole and a second portion located outside the insertion hole,
    an inner diameter of the first portion is smaller than an inner diameter of the second portion,
    the insertion hole has an opening,
    the inner diameter of the second portion increases as a distance from the opening of the insertion hole increases in a thickness direction of the attachment member, and
    a rate of change of the inner diameter of the second portion with respect to a change of position of the second portion in the thickness direction of the attachment member decreases as the distance from the opening of the insertion hole increases in the thickness direction of the attachment member.

2. The attachment structure according to claim 1, wherein the first portion includes a support section for supporting the attached portion.

3. An attachment structure for an urging member, comprising:
    an attachment member having an insertion hole; and
    a ring-shaped bushing press-fitted in the insertion hole, wherein:
    the urging member includes an attached portion that is bent and inserted into an inner side of the bushing,
    the bushing has a first portion that is arranged in the insertion hole and includes a support section for supporting the attached portion, and a second portion that is located outside the insertion hole, and
    the first portion has a circular inner circumferential surface, and an inner diameter of the first portion is larger than an outer diameter of the attached portion and smaller than an inner diameter of the second portion.

* * * * *